United States Patent
Mikami

(10) Patent No.: US 9,990,573 B2
(45) Date of Patent: Jun. 5, 2018

(54) INFORMATION PROCESSING APPARATUS, METHOD OF CONTROLLING THE SAME, AND STORAGE MEDIUM FOR PERFORMING OPERATIONS BASED ON WHETHER AN EXTERNALLY-ATTACHED DEVICE IS CONNECTED

(71) Applicant: CANON KABUSHIKI KAISHA, Tokyo (JP)

(72) Inventor: Fumio Mikami, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 14/706,643

(22) Filed: May 7, 2015

(65) Prior Publication Data
US 2015/0339560 A1    Nov. 26, 2015

(30) Foreign Application Priority Data
May 20, 2014    (JP) .................................. 2014-104510

(51) Int. Cl.
G06K 15/00    (2006.01)
G06F 21/45    (2013.01)
H04B 5/00    (2006.01)

(52) U.S. Cl.
CPC ......... G06K 15/4095 (2013.01); G06F 21/45 (2013.01); H04B 5/0056 (2013.01)

(58) Field of Classification Search
CPC ................................................ G06K 15/4095
USPC ........................................................ 358/1.14
See application file for complete search history.

(56) References Cited

U.S. PATENT DOCUMENTS

| | | | | |
|---|---|---|---|---|
| 2007/0139693 | A1* | 6/2007 | Lodolo | H04L 67/104 358/1.15 |
| 2008/0231887 | A1* | 9/2008 | Sakagami | H04N 1/00204 358/1.15 |
| 2009/0033972 | A1* | 2/2009 | Kato | H04N 1/00347 358/1.13 |
| 2010/0071059 | A1* | 3/2010 | Urasawa | G06F 21/31 726/19 |
| 2011/0075179 | A1* | 3/2011 | Utsumi | G06F 21/31 358/1.13 |
| 2012/0274971 | A1* | 11/2012 | Tanabe | G06F 3/1222 358/1.14 |
| 2013/0141748 | A1* | 6/2013 | Sakayama | H04N 1/00222 358/1.14 |

(Continued)

FOREIGN PATENT DOCUMENTS

| | | |
|---|---|---|
| JP | 11-259961 A | 9/1999 |
| JP | 2001101351 A | 4/2001 |

(Continued)

OTHER PUBLICATIONS

Japanese Office Action issued in corresponding Japanese Application No. 2014104510 dated Feb. 16, 2018.

*Primary Examiner* — Helen Zong
(74) *Attorney, Agent, or Firm* — Fitzpatrick, Cella, Harper & Scinto

(57) ABSTRACT

An information processing apparatus, and a method of controlling the same, determine whether or not a second reader for authentication is connected, and, in a case where it is determined that the second reader for authentication is connected, control the information processing apparatus to use the second reader for authentication rather than a first reader for authentication.

12 Claims, 10 Drawing Sheets

(56) References Cited

U.S. PATENT DOCUMENTS

| | | | | |
|---|---|---|---|---|
| 2014/0176991 A1* | 6/2014 | Yun | ............... | H04W 64/00 |
| | | | | 358/1.15 |
| 2015/0240459 A1* | 8/2015 | Kawasaki | ............... | H04B 1/04 |
| | | | | 701/50 |
| 2015/0310233 A1* | 10/2015 | Kwak | ............... | G06K 19/07766 |
| | | | | 235/437 |

FOREIGN PATENT DOCUMENTS

| JP | 2009501990 A | 1/2009 |
|---|---|---|
| JP | 2009294818 A | 12/2009 |
| JP | 2011170710 A | 9/2011 |

* cited by examiner

F I G. 1A
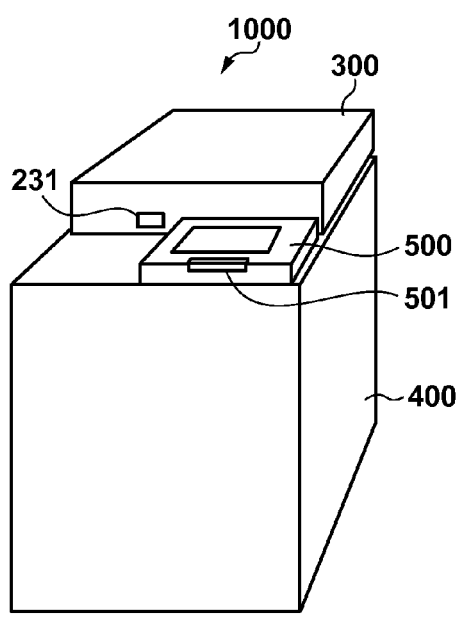
F I G. 1B
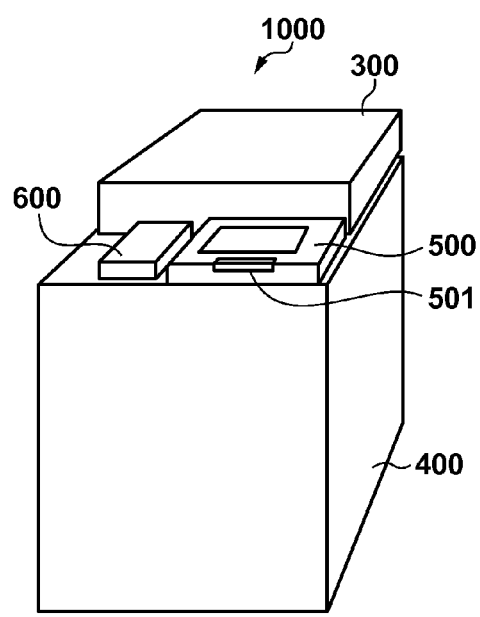

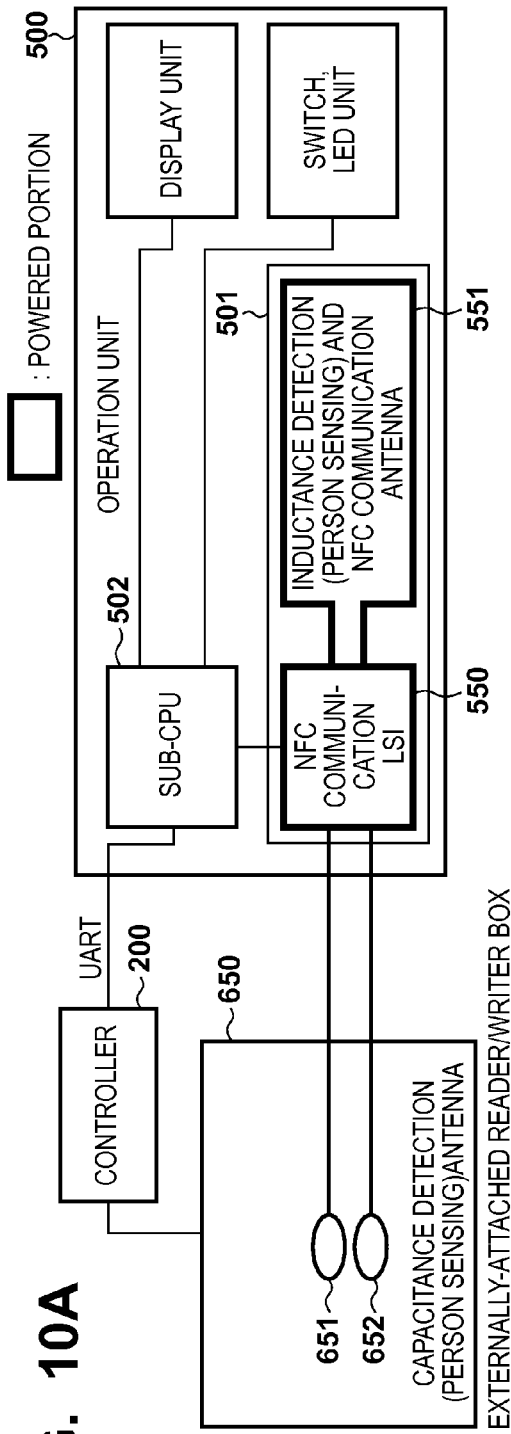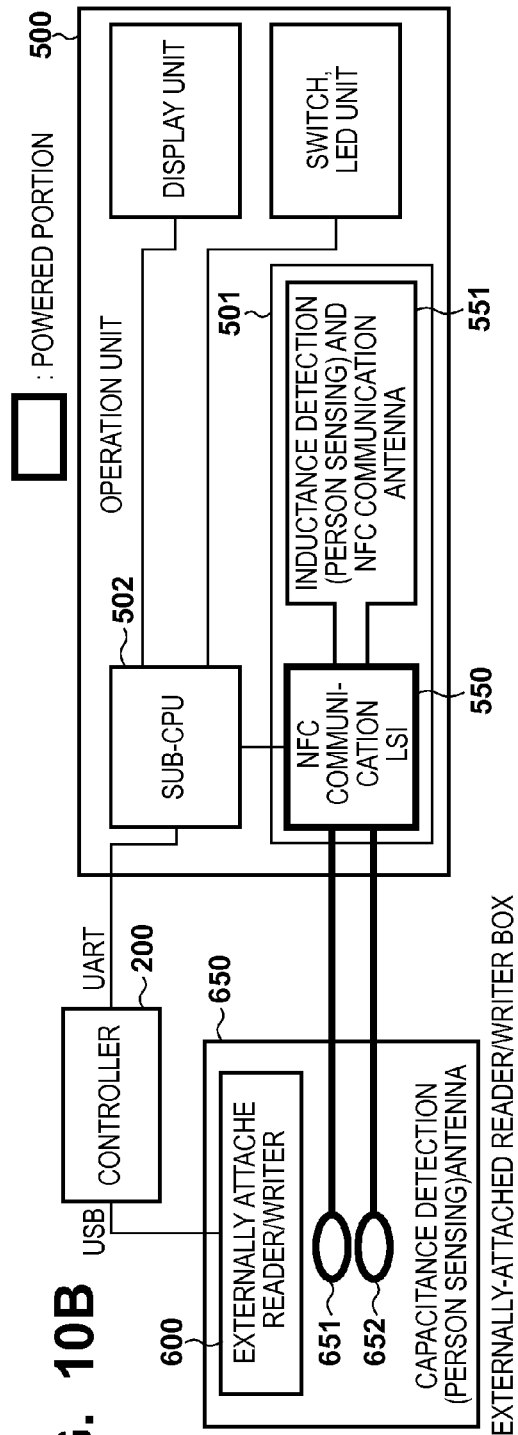

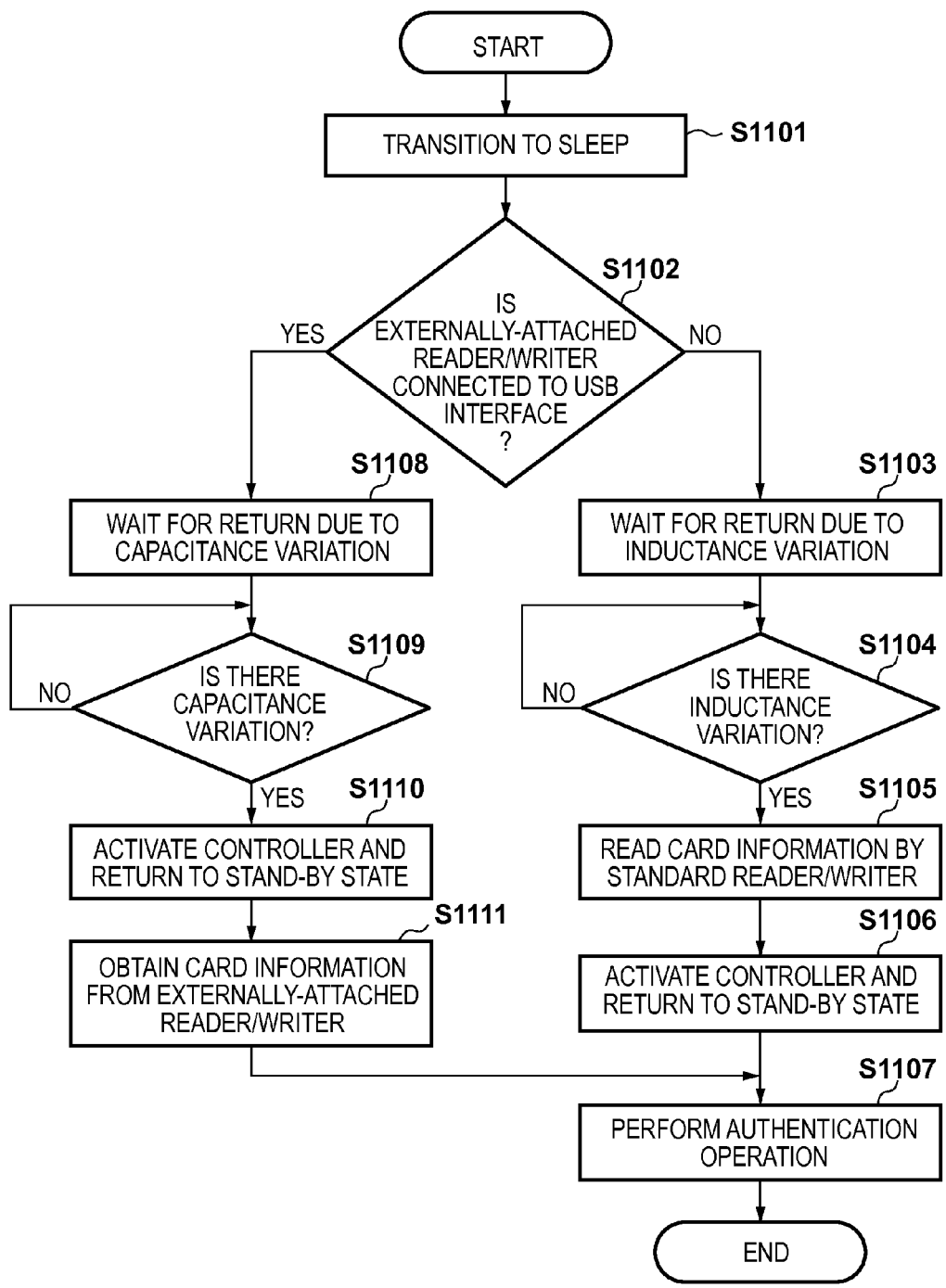

INFORMATION PROCESSING APPARATUS, METHOD OF CONTROLLING THE SAME, AND STORAGE MEDIUM FOR PERFORMING OPERATIONS BASED ON WHETHER AN EXTERNALLY-ATTACHED DEVICE IS CONNECTED

BACKGROUND OF THE INVENTION

Field of the Invention

The present invention relates to information processing apparatus, a method of controlling the same and a storage medium.

Description of the Related Art

Information processing apparatuses equipped with card reader/writers used for authentication that use a short-range wireless communication are known. A low power consumption NFC reader/writer is built into such an information processing apparatus as standard, and the NFC reader/writer is energized even in a sleep state. Then, when an NFC card is held up in the sleep state, a standby state is automatically returned to from the sleep state and authentication is performed.

Also, there are such apparatuses that are configured so as to be able to handle an externally attached general-purpose reader/writer for an IC card that cannot be handled by a standard built-in reader/writer. In such a case, the user cannot determine whether to use the built-in reader/writer or the externally attached reader/writer. In Japanese Patent Laid-Open No. H11-259961, it is recited that, for example, a built-in device and an externally-attached device are used separately and a user selects which one with a selection button.

In the invention recited in the above described patent document, the user cannot determine whether the standard reader/writer or the externally-attached reader/writer is suitable in a case where an IC card for authentication is caused to be read by a reader/writer even though the user selected the device to use. In a case where, for this reason, the user mistakenly holds up an IC card to a reader/writer that is not suitable and tries to authenticate and there is an authentication error, the user will determine that it is impossible to log in and use the apparatus with the IC card of the user.

SUMMARY OF THE INVENTION

An aspect of the present invention is to eliminate the above-mentioned problems with the conventional techniques.

A feature of the present invention is to provide a technique in which a user will not perform an erroneous operation because operation of a built-in reader/writer and an externally-attached reader/writer is switched in accordance with whether or not the externally-attached reader/writer is connected.

According to an aspect of the present invention, there is provided an information processing apparatus into which a first reader for authentication is built, and to which a second reader for authentication is connectable, the apparatus comprising: a determination unit configured to determine whether or not the second reader for authentication is connected; and a control unit configured to, in a case where it is determined by the determination unit that the second reader for authentication is connected, control the information processing apparatus to use the second reader for authentication rather than the first reader for authentication.

According to another aspect of the present invention, there is provided an information processing apparatus into which a first reader is built, and to which a second reader is connectable, the apparatus comprising: a determination unit configured to determine whether or not the second reader is connected; and a control unit configured to, in a case where it is determined by the determination unit that the second reader is not connected, control the first reader to operate alternatingly in a first operation mode and in a second operation mode, and in a case where it is determined by the determination unit that the second reader is connected, control the first reader to operate in the first operation mode in a fixed manner.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A and FIG. 1B are outline views for explaining a standard configuration of an MFP according to embodiments of the present invention.

FIG. 10A and FIG. 10B are block diagrams for showing the configuration of the operation unit of the MFP according to a fourth embodiment of the present invention.

FIG. 11 is a flowchart for describing processing for when the MFP according to the fourth embodiment returns from a power saving state.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that in the embodiments, an information processing apparatus of the present invention will be explained with an example of a multi function peripheral (MFP) having a printing function, a scanning function, a box function, a facsimile function, or the like, but the present invention is not limited to this kind of an MFP.

Figure 2:
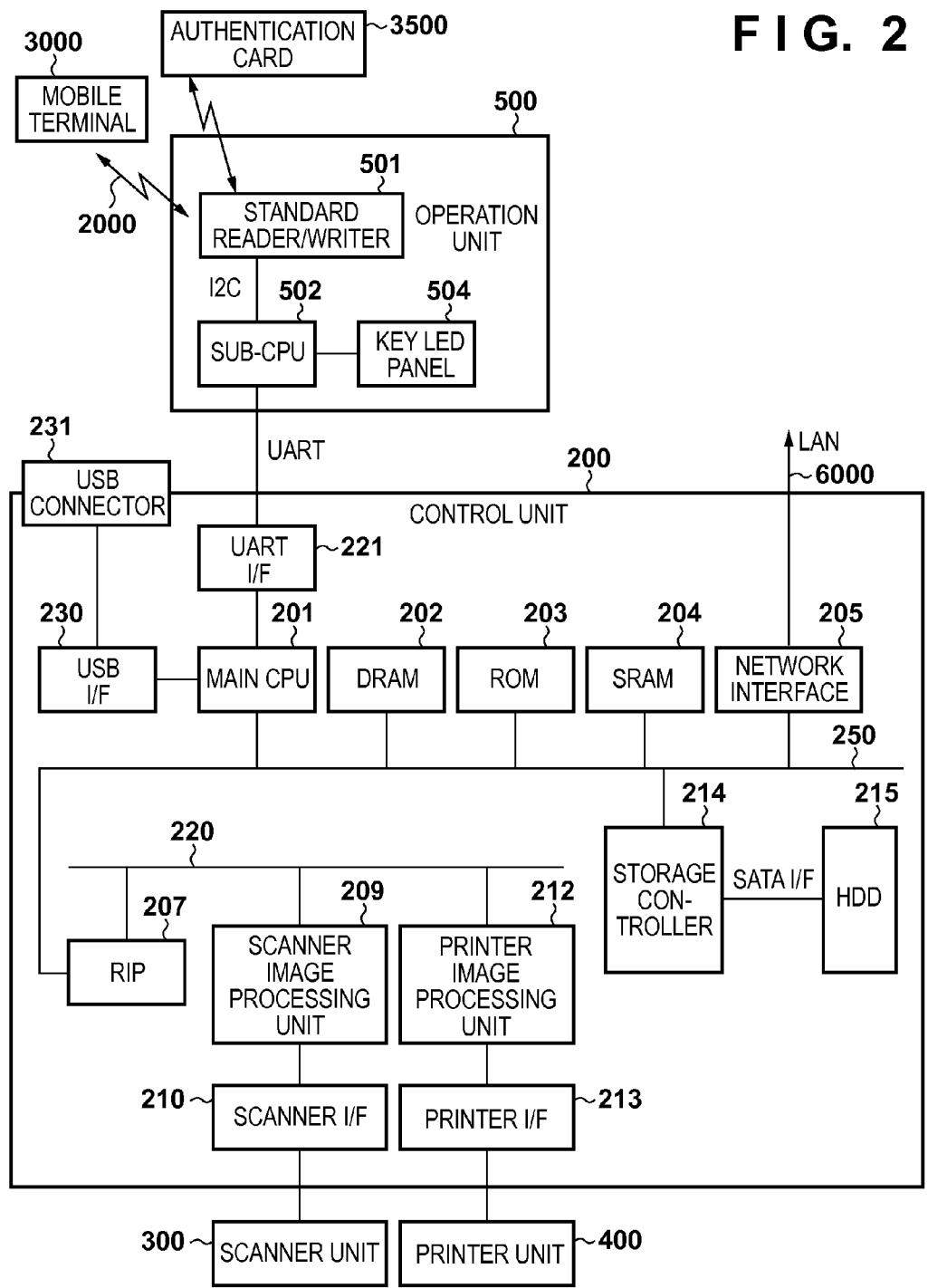
FIG. 2 is a block diagram for explaining a configuration of the MFP for which a standard reader/writer is built in for an operation unit as shown in FIG. 1A.

FIG. 1A and FIG. 1B are outline views for explaining a standard configuration of an MFP 1000 according to embodiments of the present invention. The MFP 1000 comprises a scanner unit 300, a printer unit 400, and an operation unit 500. Within the operation unit 500, an NFC reader/writer 501 (hereinafter referred to as a standard reader/writer) is mounted by standard. When an NFC card is held up to the standard reader/writer 501, information of the IC card is read, and is communicated to a controller (control unit) 200 which is shown in FIG. 2. With this, the controller 200 is able to perform an authentication of the user who is the owner of the card. The standard reader/writer 501 is able to read a particular card such as most Type-A cards or FeliCa® cards that use a short-range wireless communication that uses 13.56 MHz. However, the standard reader/writer 501 cannot access a secure region of a FeliCa® card. Also, it is not possible to read a Type-B card or an authentication card of a wireless communication method or contact type that uses a frequency other than 13.56 MHz by the standard reader/writer 501. For this reason, it is necessary to deal with authentication cards that cannot be handled by the built-in standard reader/writer 501 that a user owns by connecting to an externally-attached reader/writer 600.

A USB connector 231 in FIG. 1A is arranged for connecting externally-attached reader/writers with the controller 200. In this way the above described problem is solved by connecting a commercial reader/writer provided with a USB interface to the USB connector 231.

FIG. 1B is a view for illustrating an embodiment in which the externally attached reader/writer 600 is connected to the USB connector 231. The externally attached reader/writer 600 is a reader/writer that corresponds to an authentication card of a user, and a commercial product may be used.

Here, a problem that arises with the configuration of FIG. 1B is that the following problem occurs when a function of the standard reader/writer 501 is operating.

As described above, because the standard reader/writer 501 does not have a function for deciphering an encryption key necessary for accessing a secure area of a FeliCa® card, the standard reader/writer 501 cannot access the secure region of a FeliCa® card. In a case where a user uses a card that uses a secure area of FeliCa®, because the standard reader/writer 501 is able to perform communication with the FeliCa® card itself, it is possible to read ID information of the FeliCa® card of the user.

Meanwhile, as described above, it is necessary to connect the externally attached reader/writer 600 which has the function for decrypting encryption in order to access the region so as to access the secure region of a FeliCa® card. In such a case, the following malfunction occurs when the standard reader/writer 501 is caused to operate when the externally attached reader/writer 600 is connected. That is, when an authentication card necessary for accessing a secure region, such as a FeliCa® card, is held up to the standard reader/writer 501, the standard reader/writer 501 can access a nonsecure region such as one comprising the ID information of the card, or the like. However, because the secure region cannot be accessed, information for performing the authentication of the user by that card will not be obtained, and this will result in an authentication failure. From the perspective of the user, it cannot be distinguished whether the authentication failure occurs because the card reader cannot access the secure region of the card, or whether the authentication failure occurs because, as a result of authenticating, usage by the user is not permitted. For this reason, the user will not know what kind of an action to take to cause the user authentication to succeed.

So, in embodiments, when the externally attached reader/writer 600 is connected, the externally attached reader/writer 600 is caused to operate as a reader/writer for authentication, and the authentication function of the standard reader/writer 501 that is built-in is caused to stop.

In this way, if the authentication function of the standard reader/writer 501 is stopped, when the user mistakenly holds up the card of the user to the standard reader/writer 501, there will be no response, and the user will be able to determine that the user authentication cannot be performed using the standard reader/writer 501. In this way, it is possible to naturally prompt for authentication using the externally attached reader/writer 600, and the convenience of the user can be improved.

There also exist Type-A cards that use a secure region, and it depends on the reader/writer whether or not it is possible to access the secure region of the card. For this reason, the same malfunction will occur as in the case of the above described FeliCa® card in a case in which a user uses the secure region of a Type-A card. Accordingly, by causing the authentication operation by the standard reader/writer 501 which is built-in to stop when connecting the externally attached reader/writer 600, a similar effect can be achieved in this case as well.

FIG. 2 is a block diagram for explaining a configuration of the MFP 1000 for which the standard reader/writer 501 is built in for the operation unit 500 as shown in FIG. 1A.

Figure 3:
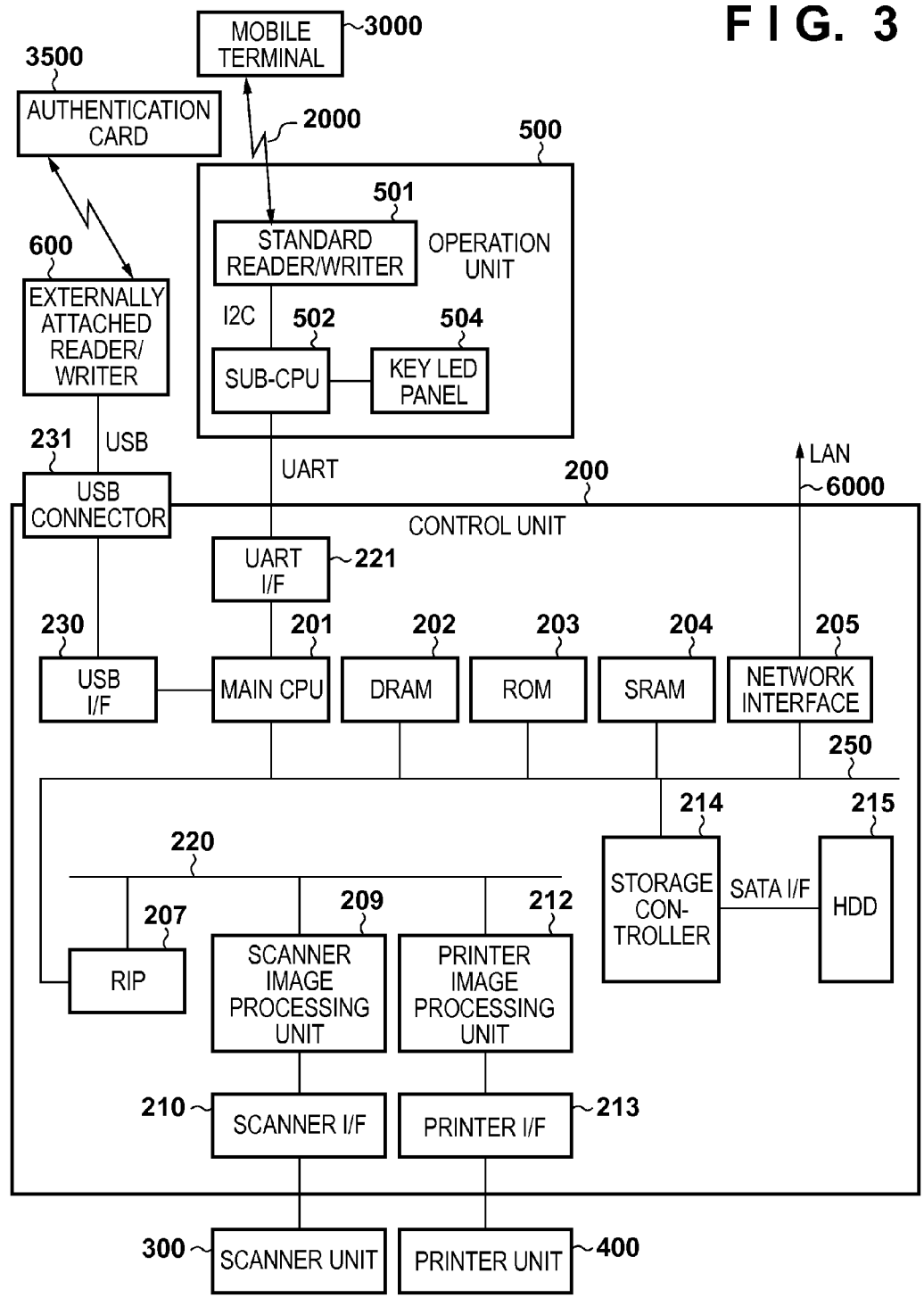
FIG. 3 is a block diagram for explaining a configuration of the MFP to which an externally attached reader/writer is connected as illustrated in FIG. 1B.

FIG. 3 is a block diagram for explaining a configuration of the MFP 1000 to which the externally attached reader/writer 600 is connected as illustrated in FIG. 1B. Note that common portions are indicated with the same reference numerals in FIG. 2 and FIG. 3. The MFP 1000 according to the present embodiment comprises the controller unit (control unit) 200, the scanner unit 300, the printer unit 400, and the operation unit 500.

A main CPU 201 executes a boot program stored in a ROM 203, reads out an OS, or programs installed in an HDD 215, and loads these into a DRAM 202 upon powering on. Then, the main CPU 201 controls the operation of the MFP 1000 by executing the loaded programs. An SRAM 204 is used for temporarily storing various data by the main CPU 201. A scanner image processing unit 209 receives via a scanner I/F 210 image data generated by the scanner unit 300 reading an original, executes image processing such as a color correction, and outputs the image data to an image bus 220.

Firstly, operation of the MFP 1000 according to embodiments will be explained with reference to FIG. 2.

The MFP 1000 receives PDL data which is print data via a LAN 6000 by a network interface 205. The received PDL data is first written to the DRAM 202, and then written to the HDD (hard disk drive) 215 via a storage controller 214. The PDL data stored in the HDD 215 is converted into a display list by the main CPU 201, and is written again to the HDD 215 via the DRAM 202. The display list of the HDD 215 is read, and sent to an RIP circuit 207, converted into raster data, and once again written to the HDD 215. Then, the raster data is read from the HDD 215 via an internal bus 250, and after darkness and screen processing, or the like, is performed by a printer image processing unit 212 via the image bus 220, the raster data is output to the printer unit 400 via a printer I/F 213 and printed.

The operation unit 500 is an operation unit of the MFP 1000, and the standard reader/writer 501 is controlled by a sub-CPU 502 as a built-in authentication unit. Furthermore, the sub-CPU 502 performs data communication with the main CPU 201 by controlling a key LED panel 504. FIG. 2 shows a standard configuration in which the standard reader/writer 501 is connected to the sub-CPU 502 via an internal I2C bus, and authentication data read from an authentication card 3500 which is held up to the standard reader/writer 501 is transmitted to the sub-CPU 502. The authentication data is communicated to the main CPU 201 which is connected via a UART interface 221. With this, the main CPU 201 performs a verification by transmitting the authentication data to the authentication server via the network interface 205. In this way, the user, by authenticating with the MFP 1000, is able to print print data that is delivered in advance via a network. Alternatively, a transition to a copy screen, or the like, is possible.

Also, the standard reader/writer 501 can communicate by a peer-to-peer function or a tag mode via an NFC communication 2000 with a mobile terminal 3000 when the mobile terminal 3000 is held up to the standard reader/writer 501.

Here, because there is a limit to the types of card that can be read by the standard reader/writer 501, it is possible for the user to connect the optional externally-attached reader/writer 600 as an externally-attached authentication unit. This state is shown in FIG. 3. This externally-attached authentication unit is connected to the main CPU 201 via the USB connector 231 and a USB interface 230, and the main CPU 201 recognizes that the externally-attached reader/writer 600 is connected by a USB communication.

The externally-attached reader/writer 600 is connected to the main CPU 201 via the USB connector 231 and the USB interface 230. The main CPU 201 transmits authentication data read from the authentication card held up to the externally-attached reader/writer 600 to an authentication server via the network interface 205, and user verification is performed. Also, at this time, the standard reader/writer 501 can communicate by a peer-to-peer function or a tag mode via the NFC communication 2000 with the mobile terminal 3000 when the mobile terminal 3000 is held up to the standard reader/writer 501.

Figure 4:
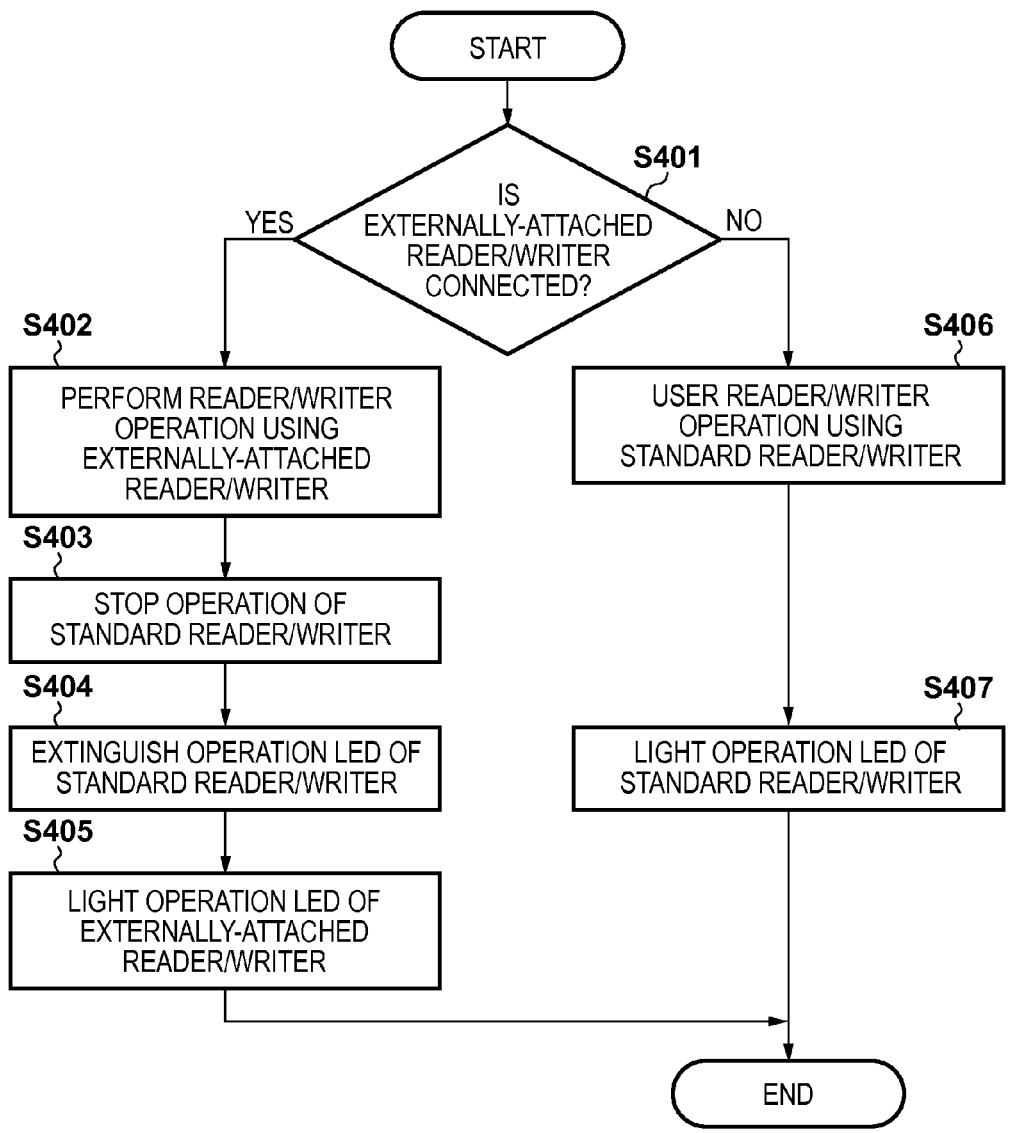
FIG. 4 is a flowchart for describing processing for which the MFP activates or returns from a sleep mode according to the first embodiment.

FIG. 4 is a flowchart for describing processing for which the MFP 1000 activates or returns from a sleep mode according to the first embodiment. A program for executing processing shown by this flowchart is installed in the HDD 215, and upon execution the program is loaded into the DRAM 202 and executed under the control of the main CPU 201. This processing is started when the MFP 1000 is activated, or returns from a sleep mode.

Firstly, in step S401, the main CPU 201 determines whether or not the externally-attached card reader/writer 600 is connected, and when the main CPU 201 determines that the externally-attached card reader/writer 600 is connected, the processing proceeds to step S402, and the externally-attached card reader/writer 600 is recognized as an authentication unit. Here, when the main CPU 201 recognizes the externally attached reader/writer 600 as an authentication unit, and the reading of the card by the externally-attached card reader/writer 600 is enabled. Next, the processing proceeds to step S403, and the main CPU 201 stops the operation of the standard reader/writer 501. Then, the processing proceeds to step S404, and the main CPU 201 extinguishes an operation LED (a light emission unit) arranged in the vicinity of the standard reader/writer 501 to clearly show that the standard reader/writer 501 is not operating. Next, the processing proceeds to step S405, and the main CPU 201 lights the operation LED of the externally attached reader/writer, and the processing completes.

Meanwhile, when, in step S401, the main CPU 201 determines that the externally-attached card reader/writer 600 is not connected, the processing proceeds to step S406, and the standard reader/writer 501 is recognized as the authentication unit, and setting is performed so that the standard reader/writer 501 performs the read operation of the card. With this, when the user holds up the card to the standard reader/writer 501, data read from the card is transmitted from the sub-CPU 502 to the main CPU 201. Next, the processing proceeds to step S407, and the main CPU 201 lights an operation LED (not shown) arranged in the vicinity of the standard reader/writer 501, displaying that the standard reader/writer 501 is operating, and the processing completes.

By the above explained processing, the standard reader/writer 501 operates as an authentication unit in a case where only the standard reader/writer 501 exists. Meanwhile, when the externally attached reader/writer 600 is connected, the obtainment of the card data by the standard reader/writer 501 is not performed, and the externally attached reader/writer 600 obtains the card data as the authentication unit.

Also, by lighting an LED corresponding to the reader/writer that is in-operation, it is possible to clearly show the user which reader/writer is enabled.

Note that in the first embodiment the existence of the externally attached reader/writer is detected upon activation or upon return from a sleep, but configuration may be taken so as to detect whether or not the reader/writer is connected to the USB interface after activating. Also, configuration may be taken so as to execute the flowchart of FIG. 4 in a case where the externally attached reader/writer 600 is connected after the MFP 1000 is activated.

Second Embodiment

Next, a second embodiment of the present invention will be explained. One authentication function for controlling whether or not to allow the user to use the device is to use an RFID (Radio Frequency IDentification) tag. Authentication information is read from an RFID tag that approaches, and based on that information an authentication of a user is performed in a device that comprises a tag reader/writer.

Meanwhile, in recent years, a technique referred to as NFC (Near Field Communication) which is one means of short-range wireless communication that is compatible with RFID has started to be implemented in mobile terminals such as smart phones, tablet PCs or the like. In the specifications of the NFC function, three functions are defined. The first is a reader/writer function which can execute the same operations as the previously described reader/writer. The second is a card emulation (tag mode) function which can execute the same operations as the previously described RFID tag. The third is a peer-to-peer function, by which it is possible to transmit/receive various data via the NFC function. By using a reader/writer implemented in a mobile terminal in which the NFC function is equipped, it is possible to perform reading and writing of data of an RFID card, an NFC card, or the like.

As explained above, it is possible to replace an authentication function for controlling whether or not to allow the user to use the device, which had previously been realized using an RFID tag, with an NFC function.

Because the NFC function can be used in various devices, a wide variety of data, from personal information such as ID information, or a telephone number to device information such as an IP address, may be transmitted/received via the NFC function. Also, even in a case where the same information (for example, ID information) is transmitted/received between devices on which the NFC function is comprised, it can be considered that the ID information will be used for an authentication function under one condition, while the ID information will be used for user information registration under a different condition. Furthermore, it is possible to execute transmission/reception of data between two devices by an operation in which the devices, which include the NFC function are caused to contact each other because the distance at which communication is possible with the NFC function is around a few centimeters.

The three functions of NFC that are described above can be freely switched by software operating on the device in which the NFC control IC is implemented. Also, regarding the power consumption of the NFC control IC, compared to the reader/writer function and the peer-to-peer function, the power consumption when the card emulation function operates is significantly less. For this reason, techniques for controlling such that the card emulation function operates for the NFC control IC in order to allow a reduction in power consumption of a device, where the device implements the NFC control IC, are being developed.

Explanation will be given for operation of the MFP 1000, which has the standard configuration shown in the previously described FIG. 1A. Note that the configuration of the MFP 1000 according to the second embodiment is the same as that of the previously described first embodiment, and so explanation will be omitted.

The standard reader/writer 501 is able to execute the foregoing three NFC functions by controlling a program with the sub-CPU 502. The execution of these functions can be set so to be performed at particular timings. In the second embodiment, an example is shown in which the reader/writer function and the peer-to-peer function are executed time-divisionally.

It is possible to read a tag or an NFC card by executing the reader/writer function. The data that is read is communicated to the main CPU 201 by a UART communication from the sub-CPU 502. The main CPU 201 performs authentication processing for transmitting the data to an authentication server on the network.

On the other hand, the execution of the peer-to-peer function is to realize a pairing function.

Figure 5:
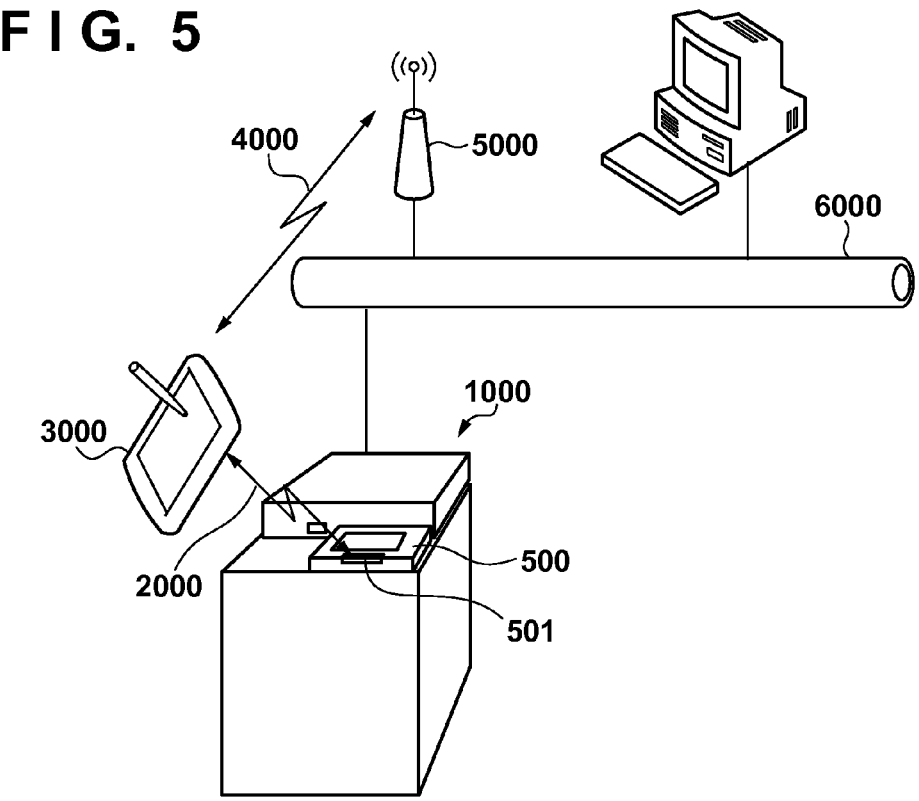
FIG. 5 is a conceptual diagram for explaining a state in which a pairing function between the MFP according to a second embodiment and a mobile terminal is realized.

FIG. 5 is a conceptual diagram for explaining a state in which a pairing function between the MFP 1000 according to the second embodiment and the mobile terminal 3000 is realized.

Here, the pairing function is for connecting the mobile terminal 3000, which is held up to the standard reader/writer 501 that the MFP 1000 is equipped with, to the MFP 1000 via the LAN 6000 and a wireless LAN communication 4000. The pairing function in the second embodiment transmits an IP address of the MFP 1000 to the mobile terminal 3000 via the NFC communication 2000. After this, the mobile terminal 3000 performs processing for setting the received IP address as a transmission destination IP address for the wireless LAN communication 4000 via an access point 5000.

Here the standard reader/writer 501 executes the reader/writer function and the peer-to-peer function switching every 200 msecs. With this, from the perspective of the user, it appears as though the two functions of the authentication operation being performed when the authentication card is held up to the standard reader/writer 501, and the pairing operation being performed when the mobile terminal 3000 is held up to the standard reader/writer 501 are operating in parallel.

This is explained with reference to the flowcharts of FIG. 6 and FIG. 7.

Figure 6:
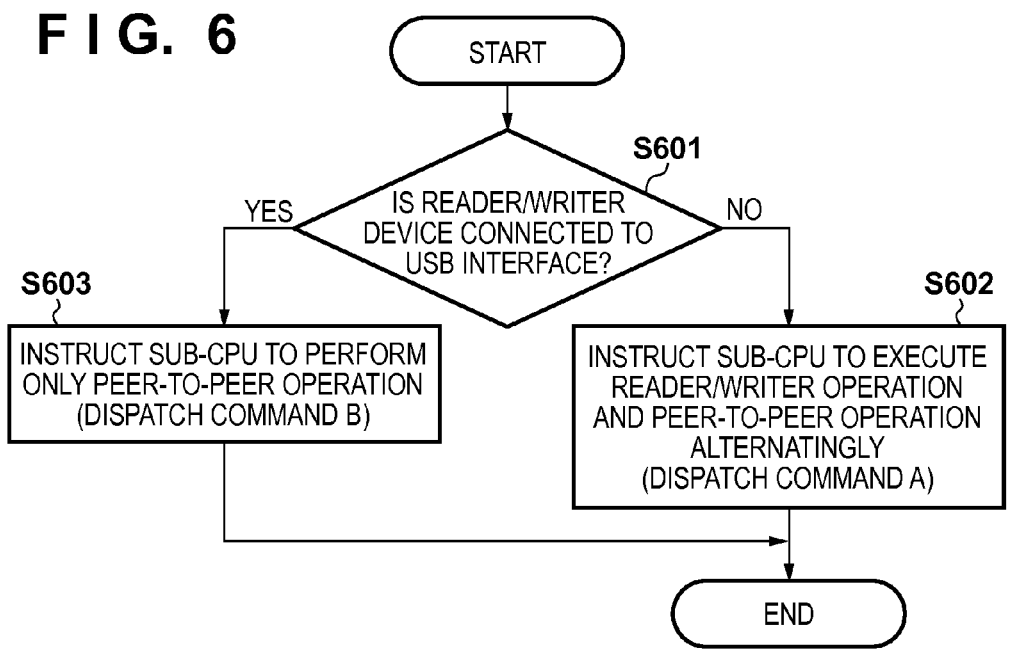
FIG. 6 is a flowchart for describing processing by a main CPU of the MFP according to the second embodiment.

FIG. 6 is a flowchart for describing processing by the main CPU 201 of the MFP 1000 according to the second embodiment. This processing is started when the MFP 1000 is activated, or returns from a sleep.

Firstly, in step S601, the main CPU 201 investigates the device connected to the USB interface 230. Here, in a case where the externally attached reader/writer 600 is detected, the processing proceeds to step S603, and an instruction is made to the sub-CPU 502 so as to cause the standard reader/writer 501 to execute only the peer-to-peer function or the tag mode operation. Then the externally attached reader/writer 600 is used as the authentication unit.

Meanwhile, in a case where, in step S601, the externally-attached card reader/writer 600 is not detected, the processing proceeds to step S602, the standard reader/writer 501 is recognized as the authentication unit. In step S602, the main CPU 201 sends the command A by a UART communication to the sub-CPU 502, and the processing completes. In such a case, the standard reader/writer 501 is controlled so as to execute the reader/writer operation and the peer-to-peer operation alternatingly.

Figure 7:
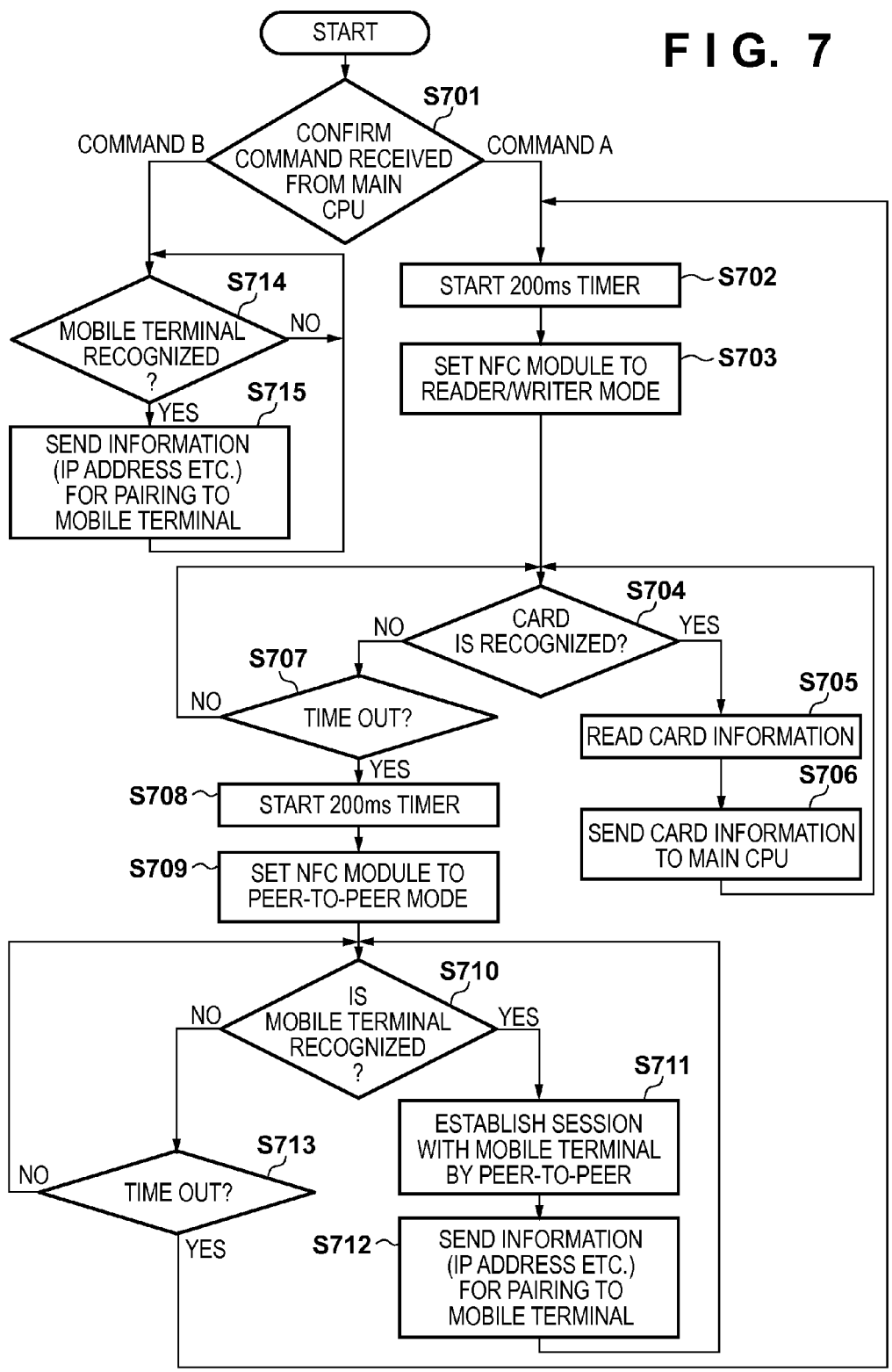
FIG. 7 is a flowchart for describing processing by a sub-CPU of the MFP according to the second embodiment.

FIG. 7 is a flowchart for describing processing by the sub-CPU 502 of the MFP 1000 according to the second embodiment.

Firstly, in step S701, the sub-CPU 502 analyzes a command received from the main CPU 201. If the command is the command A, the processing proceeds to step S702. In step S702, the sub-CPU 502 starts a 200 ms timer because this is a case in which the externally attached reader/writer 600 is not connected. Next, the processing proceeds to step S703, and the sub-CPU 502 sets the built-in NFC reader/writer module so as to perform the reader/writer operation. With this, data of the card is transmitted from the sub-CPU 502 to the main CPU 201 when the card is held up to the standard reader/writer 501. Next, the processing proceeds to step S704, and the sub-CPU 502 determines whether or not a card is held up to the reader/writer. Here, when it is determined that a card is held up to the reader/writer, the processing proceeds to step S705, and information of the card is read. Then the processing proceeds to step S706, the sub-CPU 502 sends the card information that was read to the main CPU 201, and the processing proceeds to step S704.

On the other hand, when the card is not recognized in step S704, the processing proceeds to step S707, and the sub-CPU 502 performs a checking of the timer for allowing the reader/writer mode to continue. Then, when the timer times out, the processing proceeds to step S708, and the sub-CPU 502 performs a setting of a timer for allowing the peer-to-peer mode to continue. Then, the processing proceeds to step S709, and the sub-CPU 502 sets the NFC module so to perform in the peer-to-peer mode operation.

Next, the processing proceeds to step S710, and the sub-CPU 502 waits for the mobile terminal 3000 to be held up to the reader/writer. In step S710, when the mobile terminal 3000 is recognized, the processing proceeds to step S711, and the sub-CPU 502 causes peer-to-peer communication to be established with the mobile terminal 3000. Then, the processing proceeds to step S712, and the sub-CPU 502 sends pairing information by sending the IP address of the MFP 1000 to the mobile terminal 3000 that is held up to the reader/writer, and the processing proceeds to step S710. Here, the mobile terminal 3000 connects via a communication path 4000 and the access point 5000 to the sent IP address, and the session is caused to be established with the MFP 1000 via a LAN path 6000.

Meanwhile, when the mobile terminal 3000 is held up to the reader/writer in step S710, the processing proceeds to step S713, a timer for allowing the peer-to-peer mode to continue is checked, and if a timeout has occurred, the processing proceeds to step S702; otherwise the processing returns to step S710.

With this, when the externally-attached card reader/writer 600 is not connected, the standard reader/writer 501 executes the card reading for authentication and a pairing with the mobile terminal 3000 time-divisionally.

Also, when a command B is received in step S701, the processing proceeds to step S714, and the sub-CPU 502 waits for the mobile terminal 3000 to be held up to the standard reader/writer 501. When it is determined, in step S714, that the mobile terminal 3000 is held up to the standard reader/writer 501, the processing proceeds to step S715, pairing with the mobile terminal 3000 is performed by sending the IP address of the MFP 1000 from the standard reader/writer 501 to the mobile terminal 3000, and the processing proceeds to step S714. Also, when, in step S714, the mobile terminal 3000 is not held up to the reader/writer, the processing stands by in step S714.

With this, when the externally-attached card reader/writer 600 is connected, the standard reader/writer 501 is used to perform the pairing with the mobile terminal 3000.

As explained above, by the second embodiment, in a case where the externally attached reader/writer 600 is not connected, the standard reader/writer 501 is able to execute both a reader/writer function for reading an authentication card and a peer-to-peer function for performing a peer-to-peer communication with the mobile terminal time-divisionally. Also, in a case where the externally attached reader/writer 600 is connected, the standard reader/writer 501 executes a peer-to-peer function for performing a peer-to-peer communication with the mobile terminal.

Third Embodiment

In the second embodiment as previously described, the standard reader/writer 501 of the MFP 1000 executes the reader/writer function and the peer-to-peer function time-divisionally when there is no externally-attached reader/writer. In contrast to this, in the third embodiment, an example is shown in which the MFP 1000 executes the reader/writer function and the card emulation function time-divisionally by the standard reader/writer 501 when there is no externally-attached reader/writer. By the MFP 1000 performing the card emulation function operation, the reader/writer of the mobile terminal 3000 is able to read a message from the MFP 1000. Also, it is possible to write a command for the MFP 1000 from the reader/writer of the mobile terminal 3000. Note that the configuration of the MFP 1000 according to the third embodiment is the same as that of the previously described first embodiment, and so explanation will be omitted.

By using the card emulation function, the MFP 1000 is able to communicate with the mobile terminal 3000. In other words, by the card emulation function being caused to operate, it is possible to perform an equivalent operation to the peer-to-peer function between the MFP 1000 and the mobile terminal 3000.

The reason that the MFP 1000 purposely uses the card emulation function and does not use the peer-to-peer function in the third embodiment is as follows.

The NFC module installed on an apparatus that is provided with the card authentication function must have a reader/writer function, and in such a case it is possible to execute the peer-to-peer function and the card emulation function. However, an apparatus that does not have the card authentication function is sufficient to realize communication with a mobile terminal, and the communication can be realized if the card emulation function as described above is comprised.

Meanwhile, standardizing the application software installed for the mobile terminal regardless of whether it is a model that has a card authentication function or a model that does not have a card authentication function is useful in increasing the convenience of the user. For this reason, the NFC module of the apparatus that is caused to communicate with a mobile terminal must envision that the mobile terminal does not have a reader/writer function, and realizing communication with the mobile terminal by the card emulation operation is important.

In the third embodiment, explanation is given with an example of an MFP that realizes both card authentication and communication with the mobile terminal. It is possible for the MFP to read a tag or an NFC card by executing the reader/writer function. The data that is read is communicated to the main CPU 201 by a UART communication from the sub-CPU 502. The main CPU 201 realizes the authentication processing by querying an authentication server on a network based on the data. Note that this execution of the card emulation function is to realize the pairing function.

Explanation is given using FIG. 5. The pairing function is something that connects the mobile terminal 3000 that is held up to the reader/writer that the MFP 1000 is equipped with via the LAN 6000 and the wireless LAN communication 4000. The pairing function in the third embodiment transmits an IP address of the MFP 1000 to the mobile terminal 3000 via the NFC communication 2000, and after this the mobile terminal 3000 sets the IP address that is received as the transmission destination IP address for the wireless LAN communication 4000.

Here the reader/writer function and the card emulation function are executed, switching every 200 msecs. With this, from the perspective of the user, it appears as though the two functions of the user authentication operation being performed when the authentication card is held up to the standard reader/writer 501, and the pairing operation being performed when the mobile terminal is held up to the standard reader/writer 501 are operating in parallel.

Figure 8:
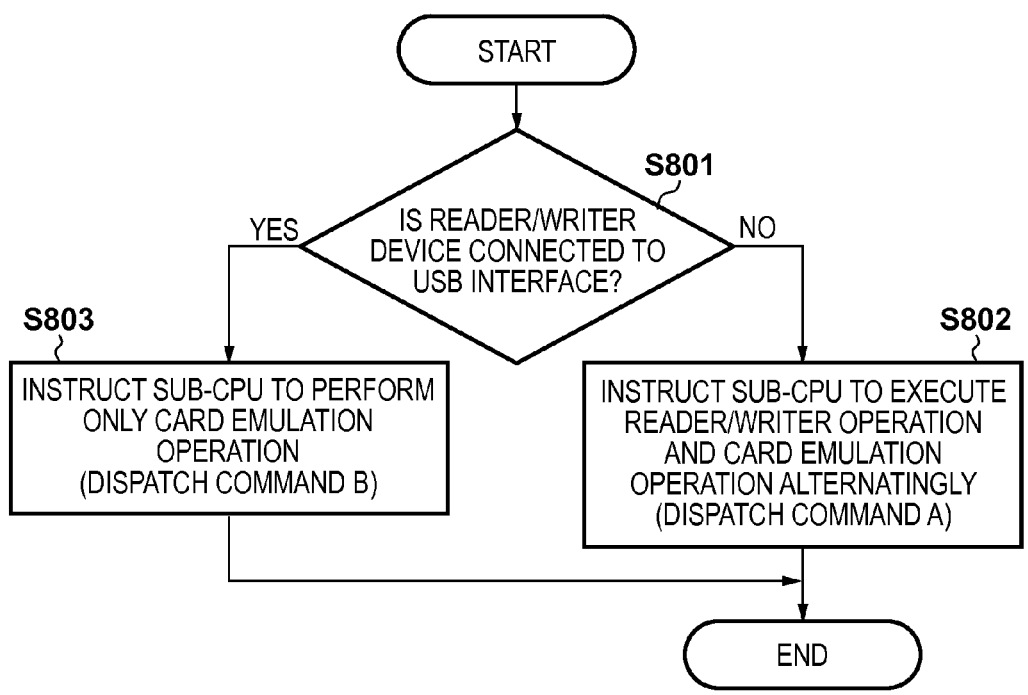
FIG. 8 is a flowchart for describing processing by the main CPU of the MFP according to a third embodiment.

FIG. 8 is a flowchart for describing processing by the main CPU 201 of the MFP 1000 according to the third embodiment. This processing is started when the MFP 1000 is activated, or returns from a sleep.

Firstly, in step S801, the main CPU 201 investigates the device connected to the USB interface 230. Here, in a case where the externally attached reader/writer 600 is detected, the processing proceeds to step S803, and the main CPU 201 recognizes the externally attached reader/writer 600 as an authentication unit. Meanwhile, in a case where, in step S801, the externally attached reader/writer 600 is not detected, the processing proceeds to step S802, the standard reader/writer 501 is recognized as the authentication unit. In step S802, the main CPU 201 sends the command A by a UART communication to the sub-CPU 502, and the processing completes. In step S803, the main CPU 201 sends the command B by a UART communication to the sub-CPU 502, and the processing completes.

Figure 9:
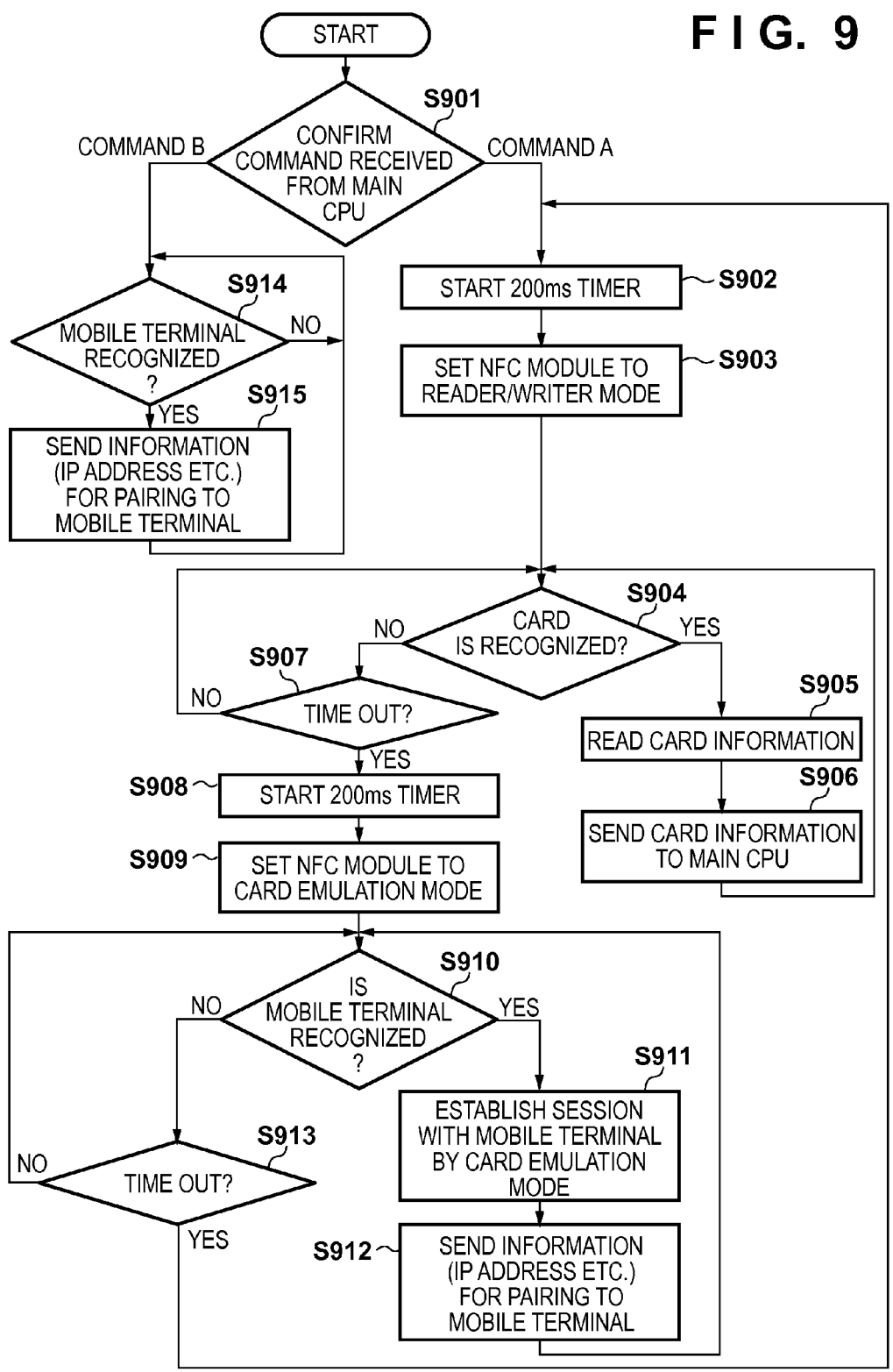
FIG. 9 is a flowchart for describing processing by the sub-CPU of the MFP according to the third embodiment.

FIG. 9 is a flowchart for describing processing by the sub-CPU 502 of the MFP 1000 according to the third embodiment.

Firstly, in step S901, the sub-CPU 502 analyzes a command received from the main CPU 201. If the command is the command A, the processing proceeds to step S902, and if the command is the command B, the processing proceeds to step S914. In step S902, a 200 ms timer is started because the externally attached reader/writer 600 is not connected. Next, the processing proceeds to step S903, and the sub-CPU 502 sets the built-in NFC reader/writer module so as to perform the reader/writer operation. With this, the data of the card is transmitted from the sub-CPU 502 to the main CPU 201 when the user holds the card up to the standard reader/writer 501. In step S904, the sub-CPU 502 determines whether or not a card is held up to the standard reader/writer 501, and when the sub-CPU 502 determines that a card is held up to the standard reader/writer 501, the processing proceeds to step S905, the sub-CPU 502 reads the card information, and the processing proceeds to step S906. Then in step S906, the sub-CPU 502 transmits the card information that was read to the main CPU 201, and the processing proceeds to step S904.

On the other hand, when the card is not recognized in step S904, the processing proceeds to step S907, and the sub-CPU 502 performs a checking of a timer for allowing the reader/writer mode to continue. When a timeout occurs in step S907, the processing proceeds to step S908, and the sub-CPU 502 starts the 200 ms timer to allow the card emulation operation to continue. Then, the processing proceeds to step S909, and the sub-CPU 502 sets the NFC module so to perform in the card emulation operation. Next, the processing proceeds to step S910, and the sub-CPU 502 determines whether or not the mobile terminal 3000 is held up to the reader/writer, and if the sub-CPU 502 recognizes that the mobile terminal 3000 is held up to the reader/writer, the processing proceeds to step S911, and the sub-CPU 502 causes a card emulation communication to be established with the mobile terminal 3000. Then the processing proceeds to step S912, and the sub-CPU 502 sends pairing information by transmitting the IP address of the MFP 1000 to the mobile terminal 3000. With this, the mobile terminal 3000 connects to the IP address that was sent via the wireless LAN communication 4000 and the access point 5000, and causes a session to be established with the MFP 1000 via the LAN path 6000. Meanwhile, when, in step S901, the mobile terminal 3000 is not recognized, the processing proceeds to step S913, and the sub-CPU 502 checks the timer for allowing the card emulation operation to continue, and if a timeout has occurred, the processing proceeds to step S902.

With this, when the externally-attached card reader/writer 600 is not connected, the standard reader/writer 501 executes the card reading for authentication and the card emulation operation time-divisionally.

Also, because the externally attached reader/writer 600 is connected, the sub-CPU 502, in step S914, waits for the mobile terminal 3000 to be held up to the standard reader/writer 501, and in a case where the mobile terminal 3000 is held up to the standard reader/writer 501, the processing proceeds to step S915. In step S915, the sub-CPU 502 performs a pairing with the mobile terminal 3000 by transmitting the IP address of the MFP 1000 to the mobile terminal 3000 from the standard reader/writer 501, and the processing proceeds to step S914.

As explained above, by the third embodiment, the MFP 1000 is able to execute the reader/writer function and the card emulation function time-divisionally using a built-in reader/writer in a case where the externally attached reader/writer 600 is not connected. With this, from the perspective of the user, because the user authentication operation is performed when the authentication card is held up to the reader/writer, and the pairing operation is performed when the mobile terminal is held up to the reader/writer, it appears as though the two functions operate in parallel.

Fourth Embodiment

Next, a fourth embodiment of the present invention will be explained.

FIG. 10A and FIG. 10B are block diagrams for showing the configuration of the operation unit 500 according to a fourth embodiment of the present invention. Note that in FIGS. 10A and 10B, portions surrounded by bold line frames are indicated as portions that are powered even in a power saving state.

FIG. 10A shows a configuration of the operation unit 500 in a case of a standard configuration in which the externally attached reader/writer 600 is not connected, and FIG. 10B shows a configuration of the operation unit 500 in a case in which the externally attached reader/writer 600 is connected.

The standard reader/writer 501 includes an NFC communication LSI 550 and an antenna 551. The NFC communication LSI 550 comprises a function for communicating with an NFC device by the antenna 551 which is connected, and a function for returning to a standby state by detecting (a person detection unit) that an inductance of the antenna 551 changed in a power saving state.

Also, the NFC communication LSI 550 comprises a function for returning to the standby state from the power saving state by detecting (a person detection unit) a capacitance variation between antennas 651 and 652 that are connected. The antennas 651 and 652 are arranged in the vicinity of a box 650 for storing the externally attached reader/writer 600, and the antennas 651 and 652 are arranged so that a capacitance variation occurs when the hand of a person, or the like, approaches the externally attached reader/writer 600.

FIG. 10A shows a standard configuration where an externally attached reader/writer is not connected, and the user only uses the standard reader/writer 501. In the power saving state, the NFC communication LSI 550 of the standard reader/writer 501 and the antenna 551 are powered, but the antennas 651 and 652 are not powered. With this, when the user holds up an NFC authentication card to an NFC antenna 551 in the power saving state, standby is returned to, and at the same time card information of the authentication card is obtained, and an authentication operation is entered.

Here, the operation of a user detection function by a capacitance variation located in the vicinity of an externally attached reader/writer box 650 is stopped. Even if the externally attached reader/writer 600 is not connected, the antennas 651 and 652 are powered, and it is possible to cause a return from the power saving state to the standby state by the user approaching the externally attached reader/writer box 650. However, in such a case, because the externally attached reader/writer 600 for reading the authentication card does not exist, the authentication operation is not executed, and it is envisioned that the user will be confused. Therefore, configuration is taken such that energization of the antennas 651 and 652 is performed in the power saving state in which the externally attached reader/writer 600 is not connected, and such that the power saving state is not returned from even when the user approaches the externally attached reader/writer box 650.

Next, using FIG. 10B, a case in which the externally-attached reader/writer 600 is optionally connected will be explained. In the power saving state in such a case, the NFC communication LSI 550 of the standard reader/writer 501 and the antennas 651 and 652 are powered, but the antenna 551 is not powered.

A reader/writer function for reading an authentication card is performed by the externally attached reader/writer 600 and not performed by the built-in standard reader/writer 501. For this reason, configuration is taken such that in the power saving state, an inductance variation of the antenna 551 cannot be detected, and the power saving state is not returned from even if the user holds up the card to the antenna unit 551. Meanwhile, the user detection function by a capacitance detection by the antennas 651 and 652 is caused to operate. With this, even if the user holds up a card to the built-in standard reader/writer 501, the power saving is not returned from, but the power saving state is returned from by a hand approaching the externally attached reader/writer box 650. In other words, only in a case where a reader/writer capable of performing the authentication operation is approached and a card is held up to the reader/writer is the return from the power saving state and the authentication operation of the user performed, and the convenience of the user can be improved.

FIG. 11 is a flowchart for describing processing for when the MFP 1000 according to the fourth embodiment returns from a power saving state.

Firstly, in step S1101, the main CPU 201 transitions into a sleep which is a power saving state. Next, the processing proceeds to step S1102, and the main CPU 201 determines whether or not the externally attached reader/writer 600 is connected to the USB interface 230. When it is determined, in step S1102, that the externally attached reader/writer 600 is not connected, the processing proceeds to step S1103, and a detecting operation is started in order to perform processing for returning from the sleep state due to an inductance variation. Next, the processing proceeds to step S1104, and an occurrence of an inductance variation is awaited. In step S1104, when an inductance variation due to a card being held up to the standard reader/writer 501, for example, is detected, the processing proceeds to step S1105, and the sleep state is returned from. Then, reading by the standard reader/writer 501 of information of the card is selected, and the information of the card that is read into the NFC communication LSI 550 is stored. Next, the processing proceeds to step S1106, and the sub-CPU 502 activates the controller 200 and transitions into standby. With this, in step S1107, the main CPU 201 performs an authentication operation according to the card information that was read, and the processing completes.

Meanwhile, when it is determined that the externally attached reader/writer 600 is connected in step S1102, the processing proceeds to step S1108, and a detecting operation for returning from the sleep state in accordance with a capacitance variation is started. Then, the processing proceeds to step S1109, and the sub-CPU 502 waits for the occurrence of a capacitance variation of the antennas 651 and 652. When a capacitance variation occurs and it is detected that the user approaches, the processing proceeds to step S1110. In step S1110, the sub-CPU 502 activates the controller 200 and returns from the sleep state. Then, the processing proceeds to step S1111, the main CPU 201 obtains card information read by the externally attached reader/writer 600, the processing proceeds to step S1107, the main CPU 201 performs an authentication operation in accordance with the card information that was read, and the processing completes.

As explained above, by the fourth embodiment, in accordance with whether or not the externally attached reader/writer is connected, it is possible to switch the reader/writer that causes the return from the sleep state upon being approached, and it is possible to improve the convenience of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-104510, filed May 20, 2014, which is hereby incorporated by reference herein in its entirety.

What is claimed is:

1. An information processing apparatus into which a first reader for user authentication is built, and to which a second reader for user authentication is connectable, the apparatus comprising:
   a connector that connects the second reader to the information processing apparatus via a network;
   a memory device that stores a set of instructions; and
   at least one processor that executes the instructions to:
   determine whether or not the information processing apparatus is able to communicate with the second reader; and
   control, in a case where it is determined that the information processing apparatus is able to communicate with the second reader, the information processing apparatus to cause an operation of the first reader to stop even if the first reader is usable and to use the second reader,
   wherein the first reader is an interface device that acquires a user credential for the authentication, and
   wherein, in a case where the second reader is disconnected, the at least one processor executes the instructions to control a state of the first reader to change from a state in which the first reader is not usable for acquiring a user credential for user authentication to a state in which the first reader is usable for acquiring a user credential for user authentication.

2. The information processing apparatus according to claim 1, wherein the at least one processor executes instructions in the memory device to:
  determine whether or not the second reader is connected, and
  control, in a case where it is determined that the second reader is not connected, the information processing apparatus to use the first reader.

3. The information processing apparatus according to claim 1, wherein
  the information processing apparatus is a printing apparatus.

4. The information processing apparatus according to claim 1, wherein in accordance with an activation of the information processing apparatus, the at least one processor executes instructions in the memory device to determine whether or not the information processing apparatus is able to communicate with the second reader.

5. A method of controlling an information processing apparatus into which a first reader for user authentication is built, and to which a second reader for user authentication is connectable, the method comprising:
  connecting the second reader to the information processing apparatus via a network;
  determining whether or not the information processing apparatus is able to communicate with the second reader; and
  in a case where it is determined that the information processing apparatus is able to communicate with the second reader, controlling the information processing apparatus to cause an operation of the first reader to stop even if the first reader is usable and to use the second reader,
  wherein the first reader is an interface device that acquires a user credential for the authentication, and
  wherein, in a case where the second reader is disconnected, changing a state of the first reader from a state in which the first reader is not usable for acquiring a user credential for user authentication to a state in which the first reader is usable for acquiring a user credential for user authentication.

6. A non-transitory computer-readable storage medium storing a program for causing a computer to function as an information processing apparatus into which a first reader for user authentication is built, and to which a second reader for user authentication is connectable, the apparatus comprising:
  a connector that connects the second reader to the information processing apparatus via a network;
  a memory device that stores a set of instructions; and
  at least one processor that executes the instructions to:
    determine whether or not the information processing apparatus is able to communicate with the second reader; and
    control, in a case where it is determined by the determination unit that the information processing apparatus is able to communicate with the second reader, the information processing apparatus to cause an operation of the first reader to stop even if the first reader is usable and to use the second reader,
  wherein the first reader is an interface device that acquires a user credential for the authentication, and
  wherein, in a case where the second reader is disconnected, the at least one processor executes the instructions to control a state of the first reader to change from a state in which the first reader is not usable for acquiring a user credential for user authentication to a state in which the first reader is usable for acquiring a user credential for user authentication.

7. An information processing apparatus into which a first reader is built, and to which a second reader is connectable, the apparatus comprising:
  a memory device that stores a set of instructions; and
  at least one processor that executes the instructions to:
    determine whether or not the information processing apparatus is able to communicate with the second reader; and
    control, in a case where it is determined that the information processing apparatus is not able to communicate with the second reader, the first reader to operate alternatingly in a card emulation mode and in a reader/writer mode, and in a case where it is determined that the information processing apparatus is able to communicate with the second reader, control the first reader to operate in the card emulation mode and control the first reader not to operate in the reader/writer mode;
  wherein at least the first reader reads information by wireless communication, and the card emulation mode and the reader/writer mode are functions defined by an NFC specification.

8. The information processing apparatus according to claim 7, wherein the at least one processor executes instructions in the memory device to:
  determine whether or not the second reader is connected, and
  control, in a case where it is determined that the second reader is not connected, the first reader to operate while switching between the card emulation mode and the reader/writer mode time-divisionally.

9. The information processing apparatus according to claim 7, wherein
  the information processing apparatus is a printing apparatus.

10. The information processing apparatus according to claim 7, wherein in accordance with an activation of the information processing apparatus, the at least one processor executes instructions in the memory device to determine whether or not the information processing apparatus is able to communicate with the second reader.

11. A method of controlling an information processing apparatus into which a first reader is built, and to which a second reader is connectable, the method comprising:
  determining whether or not the information processing apparatus is able to communicate with the second reader; and
  in a case where it is determined that the information processing apparatus is not able to communicate with the second reader, controlling the first reader to operate alternatingly in a card emulation mode and in a reader/writer mode, and in a case where it is determined that the information processing apparatus is able to communicate with the second reader, controlling the first reader to operate in the card emulation mode and controlling the first reader not to operate in the reader/writer mode, wherein the card emulation mode and the reader/writer mode are functions defined by an NFC specification.

12. A non-transitory computer-readable storage medium storing a program for causing a computer to function as an information processing apparatus into which a first reader is built, and to which a second reader is connectable, the apparatus comprising:
   a memory device that stores a set of instructions; and
   at least one processor that executes the instructions to:
      determine whether or not the information processing apparatus is able to communicate with the second reader; and
      control, in a case where it is determined by the determination unit that the information processing apparatus is not able to communicate with the second reader, the first reader to operate alternatingly in a card emulation mode and in a reader/writer mode, and in a case where it is determined by the determination unit that the information processing apparatus is able to communicate with the second reader, control the first reader to operate in the card emulation mode and control the first reader not to operate in the reader/writer mode,
   wherein the card emulation mode and the reader/writer mode are functions defined by an NFC specification.

* * * * *